United States Patent
Roberts et al.

(10) Patent No.: US 11,165,703 B2
(45) Date of Patent: Nov. 2, 2021

(54) PREFIX-BASED FAT FLOWS

(71) Applicant: Juniper Networks, Inc., Sunnyvale, CA (US)

(72) Inventors: Richard Roberts, Rennes (FR); Anand Narayanan Rao, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 16/457,246

(22) Filed: Jun. 28, 2019

(65) Prior Publication Data

US 2020/0344166 A1  Oct. 29, 2020

(30) Foreign Application Priority Data

Apr. 29, 2019 (IN) .............................. 201941016940

(51) Int. Cl.
| | |
|---|---|
| *H04L 12/745* | (2013.01) |
| *H04L 12/931* | (2013.01) |
| *H04L 12/721* | (2013.01) |
| *H04L 29/12* | (2006.01) |

(52) U.S. Cl.
CPC ............ *H04L 45/748* (2013.01); *H04L 45/72* (2013.01); *H04L 49/70* (2013.01); *H04L 61/2007* (2013.01)

(58) Field of Classification Search
None
See application file for complete search history.

(56) References Cited

U.S. PATENT DOCUMENTS

| | | | |
|---|---|---|---|
| 6,826,147 B1 * | 11/2004 | Nandy | H04L 47/323 370/229 |
| 7,149,216 B1 | 12/2006 | Cheriton | |
| 7,184,437 B1 | 2/2007 | Cole et al. | |
| 9,571,394 B1 | 2/2017 | Sivaramakrishnan et al. | |
| 2017/0317928 A1 * | 11/2017 | Gude | H04L 45/72 |

FOREIGN PATENT DOCUMENTS

| | | | | |
|---|---|---|---|---|
| EP | 3122012 A1 * | 1/2017 | ............ | H04L 43/16 |
| EP | 3122012 A1 | 1/2017 | | |
| WO | 2013184846 A1 | 12/2013 | | |

OTHER PUBLICATIONS

Praveen K V, "Flow Processing," Mar. 23, 2017, github.com/Juniper/contrail-controller/wiki/Flow-processing, last accessed Jun. 28, 2019, 15 pp.

Extended Search Report from counterpart European Application No. 19200218.6, dated Mar. 30, 2020, 12 pp.

* cited by examiner

*Primary Examiner* — Kouroush Mohebbi (74) *Attorney, Agent, or Firm* — Shumaker & Sieffert, P.A.

(57) ABSTRACT

A network device includes one or more processors configured to use a fat flow rule that specifies at least one of a mask to be applied to source Internet protocol (IP) addresses or to destination IP addresses, or that source ports or destination ports are to be ignored. The one or more processors may further be configured to receive packets having different source or destination IP addresses and/or different source or destination ports, and nevertheless assign the packets to the same fat flow according to the fat flow rule, e.g., by masking the source or destination IP addresses and/or ignoring the source or destination ports of the packets. In this manner, the network device may aggregate two or more different flows into a single fat flow.

20 Claims, 10 Drawing Sheets

PREFIX-BASED FAT FLOWS

This application claims priority to India Patent Application no. 201941016940, filed Apr. 29, 2019, the entire contents of which are hereby incorporated by reference.

TECHNICAL FIELD

Techniques of this disclosure relate generally to computer networks and more particularly to virtual networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

SUMMARY

In general, this disclosure describes techniques related to forming prefix-based fat flows to include traffic of multiple flows (e.g., for multiple sources and/or destinations) into the single fat flow. The fat flows may be formed from flows based on source or destination IP addresses of the flows, e.g., using subnet prefix masks. Additionally or alternatively, the fat flows may be formed from flows based on ignoring source or destination ports for flow differentiation.

In one example, a method includes defining, by the virtual network controller device, a fat flow rule to form a fat flow comprising packets of a first flow and a second flow, the second flow being different than the first flow, wherein the fat flow rule specifies at least one of: a mask to be applied to source Internet protocol (IP) addresses or to destination IP addresses; and/or that source ports or destination ports are to be ignored; and configuring, by the virtual network controller device, a virtual router of a server device with the fat flow rule.

In another example, a method includes receiving, by a network device, a first packet comprising a first source Internet protocol (IP) address, a first destination IP address, a first source port, a first destination port, and a first protocol; determining, by the network device, a fat flow for the first packet based on a fat flow rule; forwarding, by the network device, the first packet as part of the fat flow; receiving, by the network device, a second packet comprising a second source Internet protocol (IP) address, a second destination IP address, a second source port, a second destination port, and a second protocol; determining, by the network device, the fat flow for the second packet based on the fat flow rule; and forwarding, by the network device, the second packet as part of the fat flow, wherein the fat flow rule specifies at least one of: a mask to be applied to the first source IP address and the second source IP address or to the first destination IP address and the second destination IP address; or that the first source port and the second source port or the first destination port and the second destination port are to be ignored, and wherein at least one of the first source IP address and the second source IP address are different or the first destination IP address and the second destination IP address are different, or at least one of the first source port and the second source port are different or the first destination port and the second destination port are different.

In another example, a network device includes one or more network interfaces configured to send and receive data via a network; a memory configured to store data defining a fat flow rule wherein the fat flow rule specifying at least one of: a mask to be applied to source Internet protocol (IP) addresses or to destination IP addresses; and/or that source ports or destination ports are to be ignored; and one or more processors implemented in circuitry and configured to: receive a first packet comprising a first source Internet protocol (IP) address, a first destination IP address, a first source port, a first destination port, and a first protocol; determine a fat flow for the first packet based on the fat flow rule; forward, by the network device, the first packet as part of the fat flow; receiving, by the network device, a second packet comprising a second source Internet protocol (IP) address, a second destination IP address, a second source port, a second destination port, and a second protocol; determining, by the network device, the fat flow for the second packet based on the fat flow rule; and forwarding, by the network device, the second packet as part of the same fat flow, wherein at least one of the first source IP address and the second source IP address are different or the first destination IP address and the second destination IP address are different, or at least one of the first source port and the second source port are different or the first destination port and the second destination port are different.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
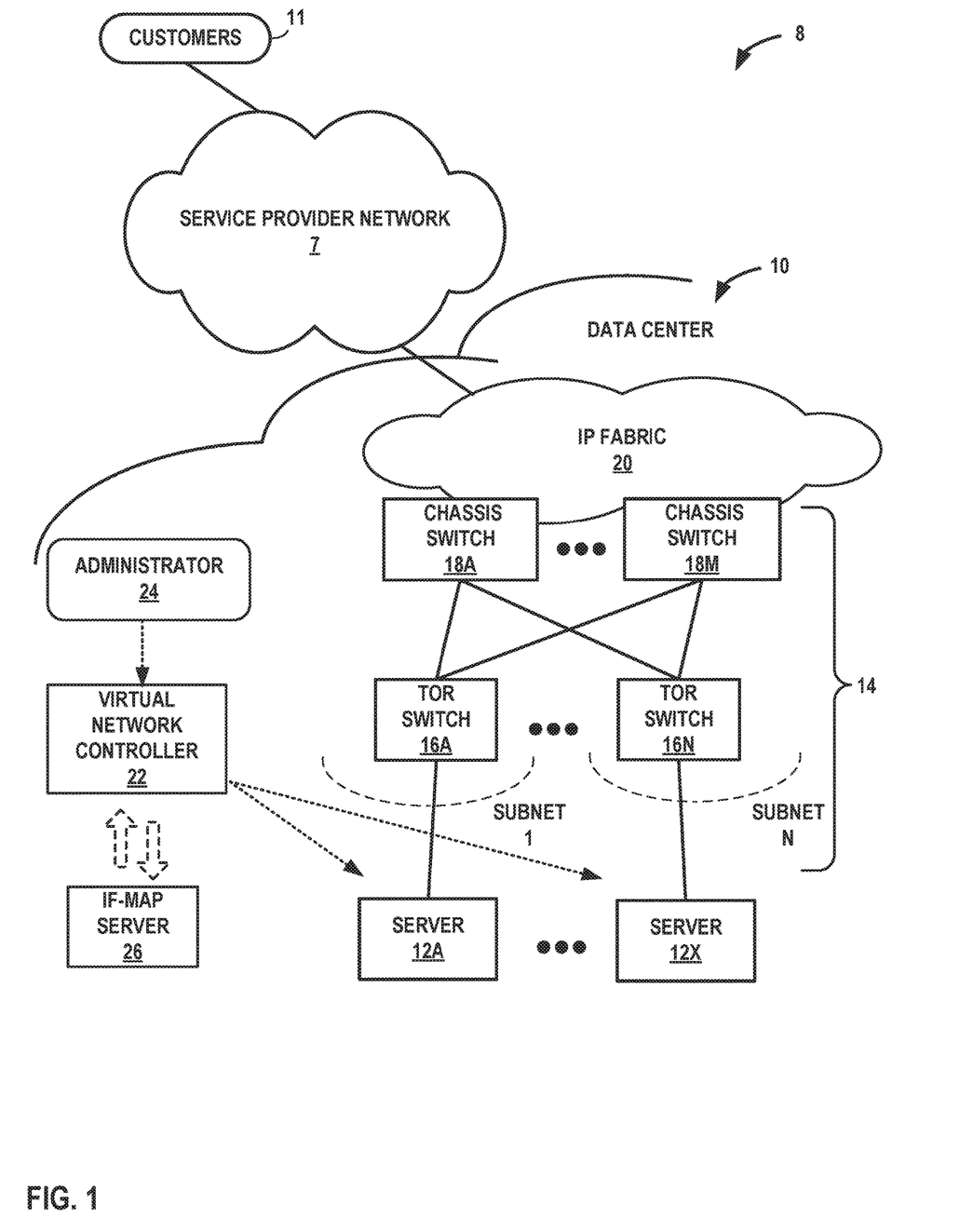
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Various types of devices may be configured to perform the techniques of this disclosure, such as virtual routers (vrouters), firewalls, load balancing devices, or the like.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 by service provider network 7.

Virtual network controller 22 ("VNC") provides a logically and in some cases physically centralized controller for facilitating operation of one or more virtual networks within data center 10 in accordance with one or more embodiments of this disclosure. In some examples, virtual network controller 22 may operate in response to configuration input received from network administrator 24. Additional information regarding virtual network controller 22 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK FLOWS, which is incorporated by reference as if fully set forth herein. Additional information regarding aggregation of packets for virtual networks is described in "TUNNELED PACKET AGGREGATION FOR VIRTUAL NETWORKS," U.S. Pat. No. 9,571,394, granted Feb. 14, 2017, the entire contents of which are hereby incorporated by reference.

Typically, the traffic between any two network devices, such as between network devices within IP fabric 20 (not shown) or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyzes one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

A virtual network function (VNF) executed by any of servers 12 may be applied to flows as part of a service chain configuration, which may further be connected to a computer network, such as the Internet. For example, the VNF may include a virtual firewall or other virtual security device, a virtual network address translation function, a virtual access gateway, virtual policy control and charging platforms, virtual traffic analysis functions, and so forth. In some cases, the VNF may be a virtual packet data network gateway (vPGW), virtual serving gateway (vSGW), virtual GPRS Gateway Serving Node (vGGSN), or other virtual gateway for a subscriber network. In such cases, millions of subscriber flows may be created with a high flow setup rate. In such cases, a virtual router (vrouter) for the server 12 executing the VNF may hit flow setup rate limits before achieving VNF performance bottlenecks.

Furthermore, this disclosure recognizes that smart network interface cards (smartNICs) will lead to more flows per second (FPS). That is, more flows on the same computing device leads to more FPS. A proper dimensioning must take account of abnormal situations (e.g., a distributed denial of service (DDOS) attack, worms, failure, reconvergence, or the like). Thus, a margin must be considered.

Conventional systems may use microflows in flow-based forwarding. For example, a controller may use a six-tuple of {source, destination, protocol, source port, destination port, next-hop identifier (NHID)} in which the five-tuple maps to the appropriate next hop (NHID) for flows that match the five-tuple. Such is described in Praveen K V, "Flow Processing," Mar. 23, 2017, github.com/Juniper/contrail-controller/wiki/Flow-processing, which is incorporated herein by reference in its entirety. A service provider may have many existing and/or new flows, which can hit vrouter limits, especially under unhealthy network conditions such as DDOS attacks and worms.

This disclosure recognizes that service providers may not actually need microflows in many cases, as there is no need for a large service provider forwarding path build with such a precise level of granularity. This is because such microflows do not scale with tens of millions of flows, and the benefits are overall poor. For example, the resources available to a vrouter (e.g., processing and memory resources) may be unable to handle such a large number of distinct flows. Thus, this disclosure describes techniques for achieving fatter flows. That is, several microflows can be grouped into a fat flow using one or more criteria. For example, VNC 22 may be configured, according to the techniques of this disclosure, to configure vrouters of servers 12 to form fat flows.

In some examples, VNC 22 may configure the vrouters of servers 12 to form fat flows to match a protocol and port number. For example, if the protocol is TCP and the port is 80, VNC 22 may configure the vrouters of servers 12 to form fat flow FF1 from flows F1, F2, . . . FN as follows:

F1=1.1.1.1, 2.2.2.2, 6, 1000, 80//(SRC, DST, PROTO, SRC_PORT, DST_PORT)

F2=1.1.1.1, 2.2.2.2, 6, 5000, 80

. . .

FN=1.1.1.1, 2.2.2.2, 6, n, 80 to result in a fat flow FF1 of:

FF1=1.1.1.1, 2.2.2.2, 6, 0, 80

In some examples, VNC 22 may further configure the vrouters of servers 12 to form fat flows that ignore a source IP address or a destination IP address. For example, if the protocol is TCP, port is 80, and the source IP address is ignored, VNC 22 may configure the vrouters of servers 12 to form fat flow FF2 from flows F1, F2, . . . as follows:

F1=1.1.1.1, 3.3.3.3, 6, 1000, 80

F2=2.2.2.2, 3.3.3.3, 6, 5000, 80 results in fat flow

FF2=0, 3.3.3.3, 6, 0, 80

In the above examples, the value of 0 operates as a wildcard (any) value. This disclosure further recognizes that conventional fat flows cannot be configured to aggregate microflows from different port numbers. Likewise, ignoring source or destination IP addresses may destroy the entropy of flows, which can disrupt load balancing applications. Thus, this disclosure describes techniques for creating a fat flow based on IP prefixes, that is, prefix-based fat flows. Thus, in accordance with the techniques of this disclosure, as discussed in greater detail below, VNC 22 may be configured, according to the techniques of this disclosure, to configure the vrouters of servers 12 to form prefix-based fat flows. As a result, load balancing may still be applied to the flows matching different prefixes that define respective fat flows.

In particular, VNC 22 may configure the vrouters with a fat flow rule that specifies at least one of a mask to be applied to source Internet protocol (IP) addresses or to destination IP addresses and/or that source ports or destination ports are to be ignored. VNC 22 may receive an input parameter specifying a length of the mask, e.g., /16 or /24 bits. Thus, in various examples, the fat flow rule may specify that flows are to be aggregated based on sharing a common source IP address prefix, a common destination IP address prefix, disregarded source ports, and/or disregarded destination ports.

In this manner, vrouters of servers 12 may apply the fat flow rule to determine a next hop for a packet, where the packet may form part of one of a large number of different flows. For example, vrouters of servers 12 may receive packets of different flows and perform a longest prefix match against IP addresses of received packets with a variety of rules, including one or more fat flow rules. Vrouters of servers 12 may store the fat flow rules in an M-trie, as explained in greater detail below with respect to, e.g., FIG. 8.

Although generally described with respect to virtual machines, the techniques of this disclosure may also be applied in other contexts, e.g., kubernetes pods (containers).

Figure 2:
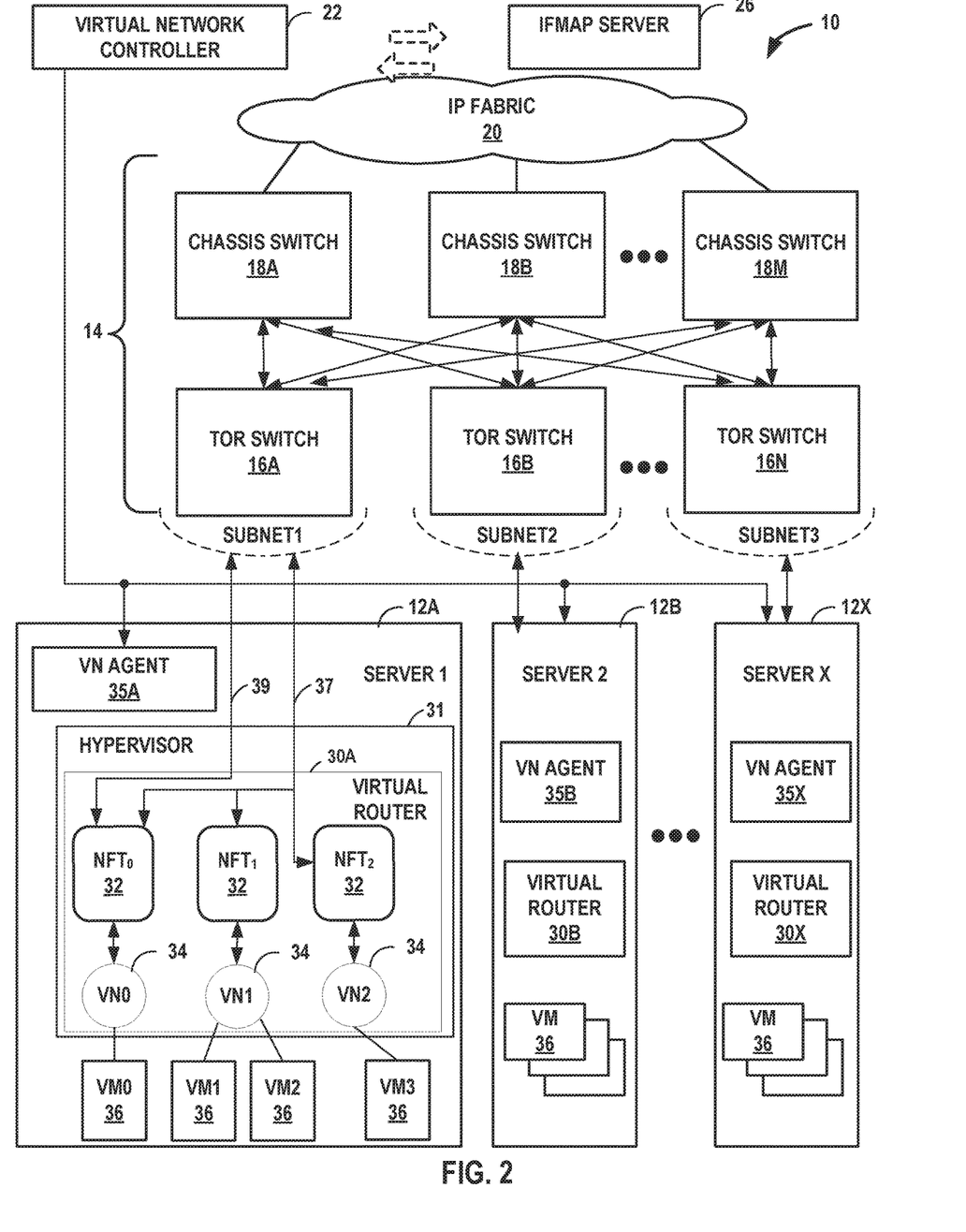
FIG. 2 is a block diagram illustrating an example implementation of the data center of FIG. 1 in further detail.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software or "virtual" switches 30A-30X (collectively, "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network.

Each virtual router 30 may execute within a hypervisor, a host operating system or other component of each of servers 12. Each of servers 12 may represent an x86 or other general-purpose or special-purpose server capable of executing virtual machines 36. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34, each of which provides a network environment for execution of one or more virtual machines (VMs) 36 on top of the virtualization platform provided by hypervisor 31. Each VM 36 is associated with one of the virtual networks VN0-VN1 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. Virtual machines as referenced herein, e.g., VMs 36, 110, and servers 12 or a separate computing device that hosts a customer application may alternatively referred to as "hosts."

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIGS. 2A and 2B.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as one or more overlay networks of data center 10. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

For example, virtual machine 36 VM1 sends a packet, an "inner packet," to virtual router 30A by an internal link. Virtual router 30A uses $NFT_1$ to look up a virtual network destination network address for the inner packet. $NFT_1$ specifies an outbound interface for virtual router 30A and encapsulation for the inner packet. Virtual router 30A applies the encapsulation to add a tunnel header to generate an outer packet and outputs the outer packet on the outbound interface, in this case toward TOR switch 16A.

The routing information may, for example, map packet key information (e.g., destination IP information and other select information from packet headers) to one or more specific next hops within the networks provided by virtual routers 30 and switch fabric 14. In some case, the next hops may be chained next hops that specify a set of operations to be performed on each packet when forwarding the packet, such as may be used for flooding next hops and multicast replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual router 30 includes a default network forwarding table $NFT_0$ and provides a default route that allows a packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual routers 30 may communicate using virtual subnet VN0 in accordance with default network forwarding table $NFT_0$ 32 during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs virtual routers 30 to update their local network forwarding tables 32. For example, virtual network controller 22 may output commands to virtual network agents 35 to update one or more NFTs 32 to direct virtual routers 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information any may issues messages to other virtual network agents 35 to update local routing information stored by the virtual network agents within network forwarding tables 32.

In accordance with the techniques of this disclosure, VNC 22 may configure any of virtual routers 30 to use fat flows, as discussed in greater detail below. For example, VNC 22 may configure virtual routers 30 with one or more fat flow rules specifying a mask to be applied to source Internet protocol (IP) addresses or to destination IP addresses of packets and/or that source ports or destination ports of packets are to be ignored when determining whether to apply the fat flow rule to the packets. Virtual routers 30, in turn, may store such fat flow rules in M-trie data structures and perform longest prefix matches to determine which forwarding rule (which may be one of the fat flow rules) is to be applied to received packets.

Figure 3:
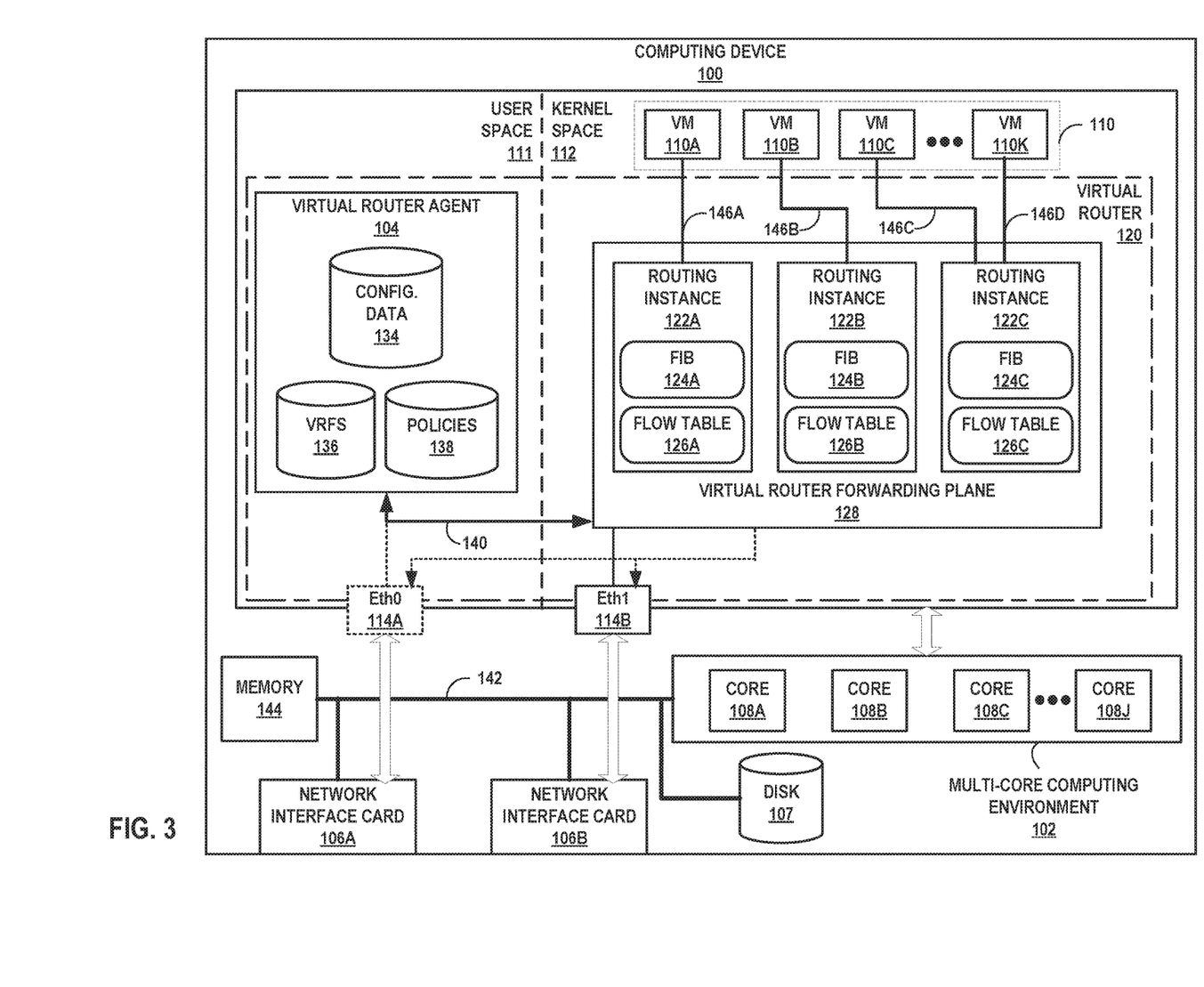
FIG. 3 is a block diagram illustrating a computing device that executes an example virtual router for virtual networks according to techniques described herein.

FIG. 3 is a block diagram illustrating a computing device that executes an example virtual router for virtual networks according to techniques described herein. Computing device 100 may represent any of servers 12 of FIGS. 1-2 or other device, such as any of TOR switches 16.

Computing device 100 includes in this example a system bus 142 coupling hardware components of a computing device 100 hardware environment. System bus 142 couples memory 144, network interface cards (NICs) 106A-106B (collectively, "NICs 106"), storage disk 107, and multi-core computing environment 102 having a plurality of processing cores 108A-108J (collectively, "processing cores 108"). Network interface cards 106 include interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, network interface cards (NICs) 106A-106B (collectively, "NICs 106"), storage disk 107, and multi-core computing environment 102 provide an operating environment for a software stack that executes a virtual router 120 and one or more virtual machines 110A-110K (collectively, "virtual machines 110"). Virtual machines 110 may represent example instances of any of virtual machines 36 of FIG. 2. The computing device 100 partitions the virtual and/or physical address space provided by main memory 144 and in the case of virtual memory by disk 107 into user space 111, allocated for running user processes, and kernel space 112, which is protected and generally inaccessible by user processes. An operating system kernel (not shown in FIG. 3) may execute in kernel space and may include, for example, a Linux, Berkeley Software Distribution (BSD), another Unix-variant kernel, or a Windows server operating system kernel, available from Microsoft Corp. Computing device 100 may in some instances execute a hypervisor to manage virtual machines 110 (also not shown in FIG. 3). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 124 may execute the virtual router 120.

Eth0 114A and Eth1 114B represent devices according to a software device model and provide device driver software routines for handling packets for receipt/transmission by corresponding NICs 106. Packets received by NICs 106 from the underlying physical network fabric for the virtual networks may include an outer header to allow the physical network fabric to tunnel the payload or "inner packet" to a physical network address for one of NICs 106. The outer header may include not only the physical network address but also a virtual network identifier such as a VxLAN tag or Multiprotocol Label Switching (MPLS) label that identifies one of the virtual networks as well as the corresponding routing instance 122. An inner packet includes an inner header having a destination network address that conform to the virtual network addressing space for the virtual network identified by the virtual network identifier. For example, virtual router forwarding plane 128 may receive by Eth1 from NIC 106 a packet having an outer header than includes a VxLAN associated in virtual router forwarding plane 128 with routing instance 122A. The packet may have an inner header having a destination network address that is a destination address of VM 110A that taps, via tap interface 146A, into routing instance 122A.

Virtual router 120 in this example includes a kernel space 112 module: virtual router forwarding plane 128, as well as a user space 111 module: virtual router agent 104. Virtual router forwarding plane 128 executes the "forwarding plane" or packet forwarding functionality of the virtual router 120 and virtual router agent 104 executes the "control plane" functionality of the virtual router 120. Virtual router agent 104 may represent an example instance of any of VN agents 35 of FIG. 2.

Virtual router forwarding plane 128 includes multiple routing instances 122A-122C (collectively, "routing instances 122") for corresponding virtual networks. Each of routing instances 122 includes a corresponding one of forwarding information bases (FIBs) 124A-124C (collectively, "FIBs 124") and flow tables 126A-126C (collectively, "flow tables 126"). Although illustrated as separate data structures, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBs 124 include lookup tables that map destination addresses to destination next hops. The destination addresses may include layer 3 network prefixes or layer 2 MAC addresses.

Flow tables 126 enable application of forwarding policies to flows. Each of flow tables 126 includes flow table entries that each match one or more flows that may traverse virtual router forwarding plane 128 and include a forwarding policy for application to matching flows. For example, virtual router forwarding plane 128 attempts to match packets processed by routing instance 122A to one of the flow table entries of flow table 126A. If a matching flow table entry exists for a given packet, virtual router forwarding plane 128 applies the flow actions specified in a policy to the packet. This may be referred to as "fast-path" packet processing. In accordance with the techniques of this disclosure, flow tables 126 may store one or more fat flow rules for matching flows. Thus, virtual router forwarding plane 128 may perform fat flow matching as part of fast-path packet processing. Policies 138 may store one or more fat flow rules. If a matching flow table entry does not exist for the packet, the packet may represent an initial packet for a new flow that matches a fat flow rule not yet configured in the appropriate flow table 126, and virtual router forwarding plane 128 may request virtual router agent 104 to install a flow table entry in the flow table for the new flow, the flow table entry specifying the matching fat flow rule for the new flow, where the matching fat flow rule matches multiple flows as described elsewhere in this document. The flow table entry may include a flow key usable for identifying packets that match the fat flow rule. This may be referred to as "slow-path" packet processing for initial packets of flows that do not match any of the existing fat flow rules in the appropriate flow table 126, and this is represented in FIG. 3 by slow path 140.

In this example, virtual router agent 104 may be a user space 111 process executed by computing device 100. Virtual router agent 104 includes configuration data 134, virtual routing and forwarding instances configurations 136 ("VRFs 136"), and policy table 138 ("policies 138"). Virtual router agent 104 exchanges control information with one or more virtual network controllers (e.g., VNC 22 of FIGS. 1-2). Control information may include, virtual network routes, low-level configuration state such as routing instances and forwarding policy for installation to configuration data 134, VRFs 136, and policies 138. Virtual router agent 104 may also report analytics state, install forwarding state to FIBs 124 of virtual router forwarding plane 128, discover VMs 110 and attributes thereof. As noted above, virtual router agent 104 further applies slow-path packet processing for the first (initial) packet of each new flow traversing virtual router forwarding plane 128 and installs corresponding flow entries to flow tables 126 for the new flows for fast path processing by virtual router forwarding plane 128 for subsequent packets of the flows.

Figure 4:
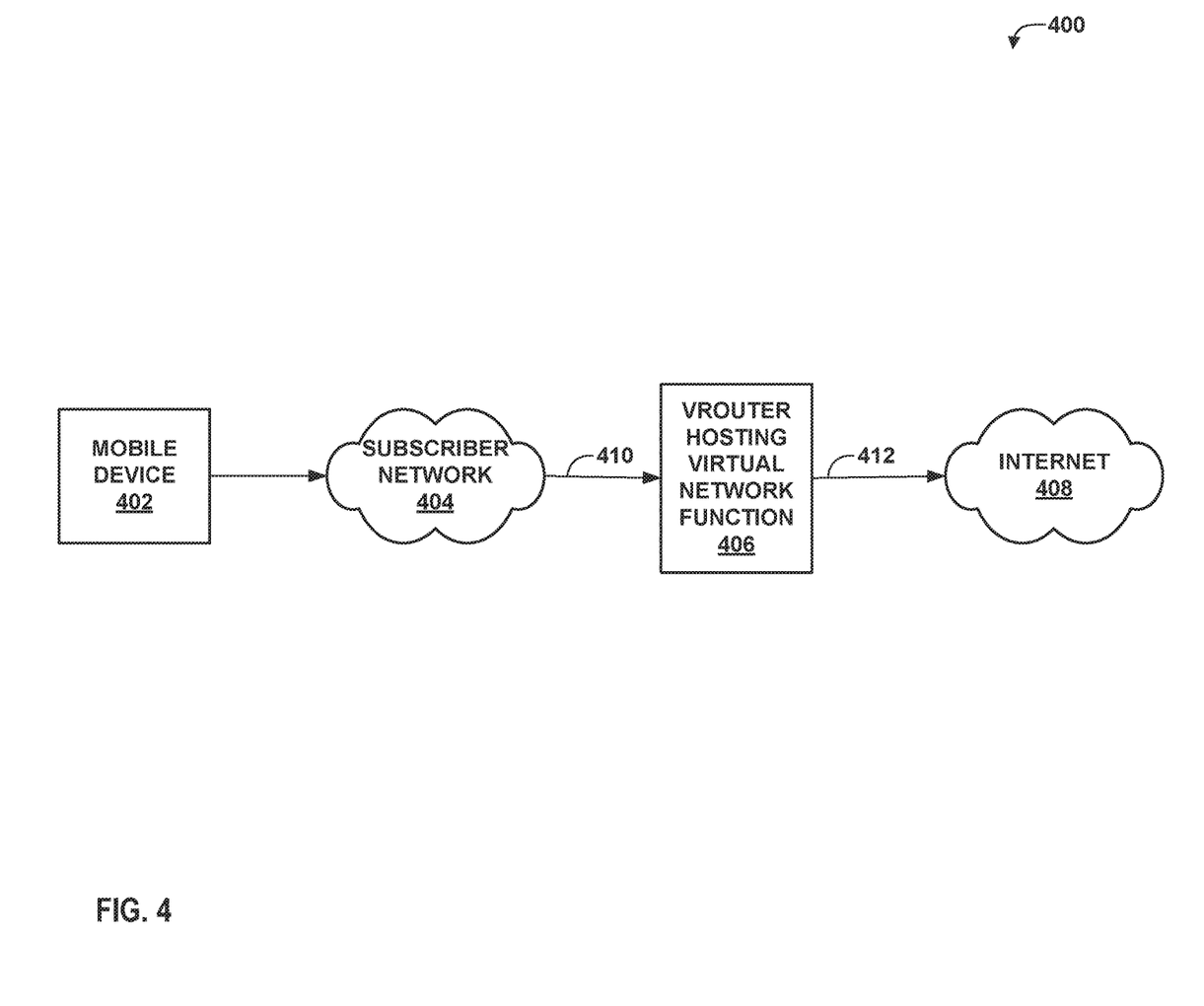
FIG. 4 is a block diagram illustrating an example system that may use prefix-based fat flows according to the techniques of this disclosure.

FIG. 4 is a block diagram illustrating an example system 400 that may use prefix-based fat flows according to the techniques of this disclosure. In this example, system 400 includes mobile device 402, subscriber network 404, Vrouter hosting virtual network function (VNF) 406, and Internet 408. Virtual network functions similar to VNF 406 may be executed by, e.g., virtual routers 30 of servers 12 of FIGS. 1 and 2.

Original flows may include the following:
HTTP (10.1.0.1, 8.8.8.8, 6, 32768, 80)
HTTP (10.1.0.2, 8.8.8.8, 6, 10000, 80)
HTTP (10.1.0.10, 8.8.8.8, 6, 20000, 80)
VNF 406 may be configured with the following fat flow rule on link 410:
Fat flow rule (Src virtual machine interface (VMI))
Proto-TCP, port-0,
AggrSrc 10.1.0.0/16, /16
Ignore Dst
VNF 406 may be configured with the following fat flow rule on link 412:
Fat flow rule (Dst VMI)
Proto-TCP, port-0,
AggrDst 10.1.0.0/16, /16
Ignore Src
Thus, resulting fat flows on links 410 and 412 may be, respectively:
(10.1.0.0, 0, 6,0,0*)
(0, 10.1.0.0, 6,0,0*)—reverse
where *0 means "any."

The virtual machine interface may also be another type of virtual interface, such as a veth pair, a VLAN, or other tap interface for communications between the vrouter and the VNF. The VNF may be executed using a virtual machine or container, for instance. With such prefix-based fat flows, depending on configuration, virtual network controller 22 can create one fat flow for 256 flows (/24 aggregate mask) or one fat flow for 65 k flows (/16 mask). Such 1:256 or 1:65 k scaling yields a large improvement to flow setup rate. These techniques provide a natural way to create /64 flows for IPv6 instead of /128 flows.

Figure 5:
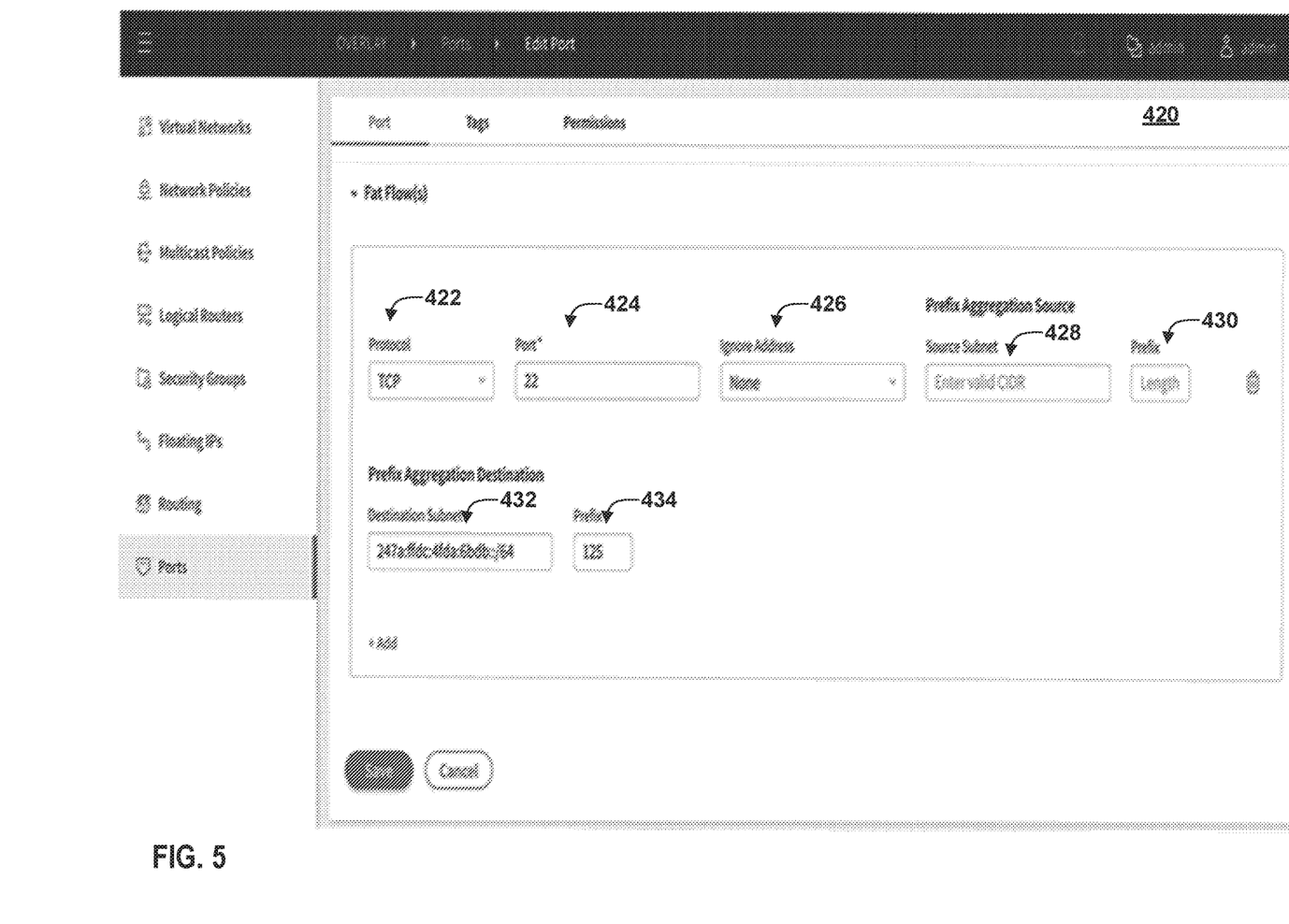
FIG. 5 is a conceptual diagram illustrating an example graphical user interface (GUI) for configuring fat flows according to the techniques of this disclosure.

FIG. 5 is a conceptual diagram illustrating an example graphical user interface (GUI) 420 for configuring fat flows according to the techniques of this disclosure. GUI 420 includes protocol field 422, port field 424, ignore address field 426, source subnet field 428 and source prefix field 430 for a prefix aggregation source, and destination subnet field 432 and destination prefix field 434 for a prefix aggregation destination. Thus, GUI 420 allows an administrator (e.g., administrator 24) to configure source and destination prefixes using source prefix field 430 and destination prefix field 434, respectively, along with masks and aggregate prefix lengths.

In this example, source prefix field 430 allows a user, such as an administrator, to specify a length of a prefix mask (e.g., a numbers of bits) to be applied to source IP addresses. A similar field may be provided to mask a destination IP address. The prefix masks may be used when determining Virtual network agents 35 of FIG. 2 may be configured to handle configuration for add, update, and/or deletion at the virtual machine and/or virtual network level, and to program a corresponding one of virtual routers 30 accordingly. Virtual network agents 35 may also maintain respective databases of fat flow rules (e.g., based on a C++ set). Virtual network agents 35 may further handle the first packet of each flow and create a fat flow based on a rule match.

Virtual routers 30 of FIG. 2 may handle new configuration for add, update, and/or deletion at the virtual machine level. Virtual routers 30 may also maintain a database of fat flow rules per virtual interface (VIF) in an M-Trie data structure for fast prefix-based lookup and searching of fat flow rules. Thus, the M-Trie data structures may store prefix-based fat flow rules in addition to nexthops. The VIFs may further be used to display new fat flow rules.

Figure 6:
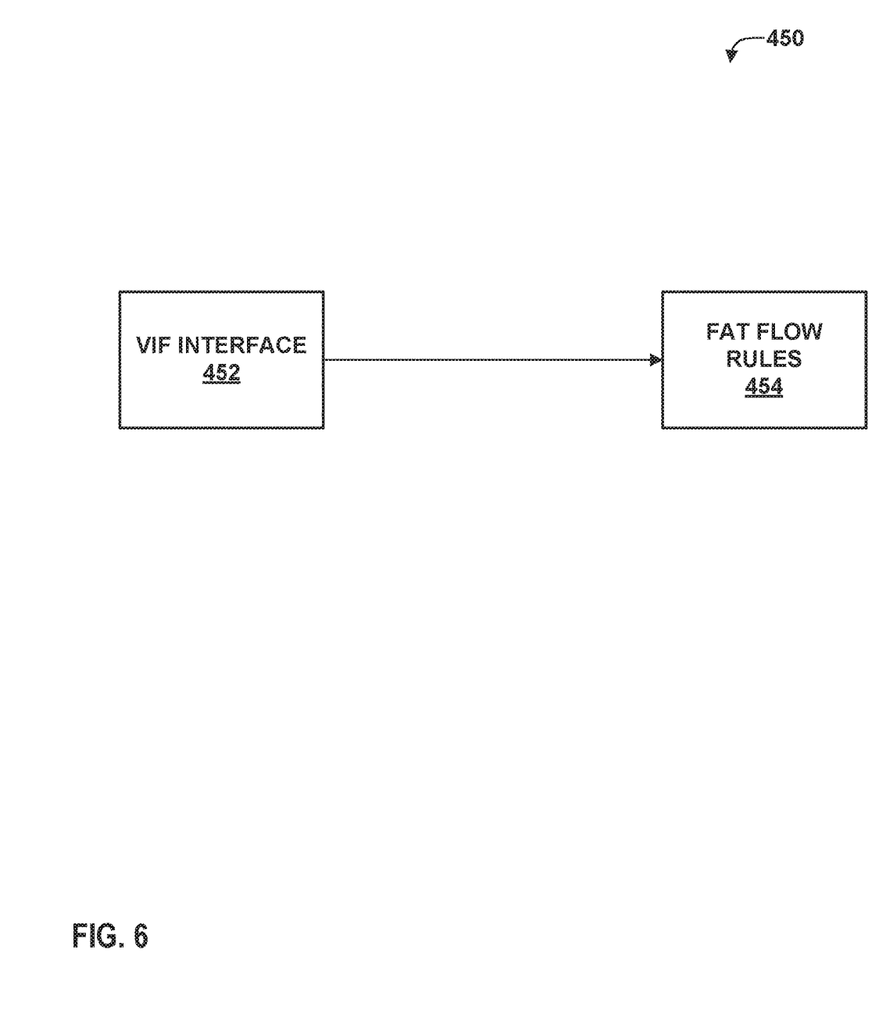
FIG. 6 is a block diagram illustrating an example data structure design for a virtual network agent according to the techniques of this disclosure.

FIG. 6 is a block diagram illustrating an example data structure design 450 for a virtual network agent according to the techniques of this disclosure. Data structure design 450 includes VIF interface 452 and fat flow rules 454. Fat flow rules 454 may be stored as an internal C++ set. In some examples, fat flow rules 454 may include elements stored in a red-black tree, which also keeps the rules in sorted order. During flow creation, one of VN agents 35 may search fat flow rules 454 to see if there is a match with either source/destination P address, source/destination port, and protocol fields of a packet. If there is a match with any of fat flow rules 454, the one of VN agents 35 creates the prefix-based fat flow.

Figure 7:
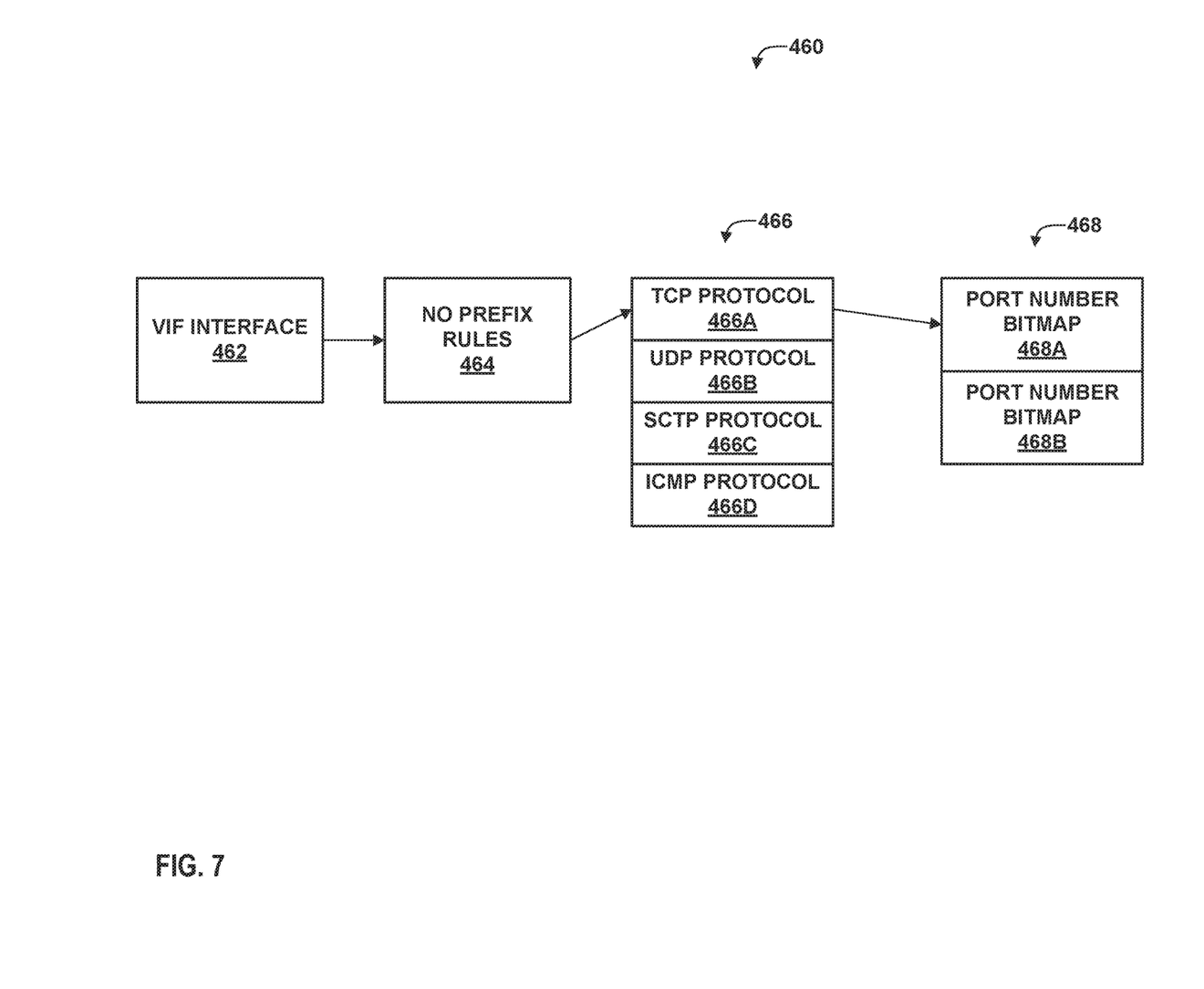
FIG. 7 is a block diagram illustrating an example data structure design for a virtual router according to the techniques of this disclosure.

FIG. 7 is a block diagram illustrating an example data structure design 460 for a virtual router according to the techniques of this disclosure. Data structure design 460 includes VIF interface 462, no-prefix-rules 464, protocol elements 466 including, e.g., TCP protocol 466A, UDP protocol 466B, SCTP protocol 466C, and ICMP protocol 466D, and port number bitmaps 468 including port number bitmap 468A and port number bitmap 468B. No-prefix-rules 464 generally define rules without source or destination prefix aggregation configured. In this example, port number bitmap 468A is for ports 0 to 511 and port number bitmap 468B is for ports 512 to 1023. Each of port bitmaps 468A, 468B contains two bits per port to indicate "ignore source" or "ignore destination" configuration.

Figure 8:
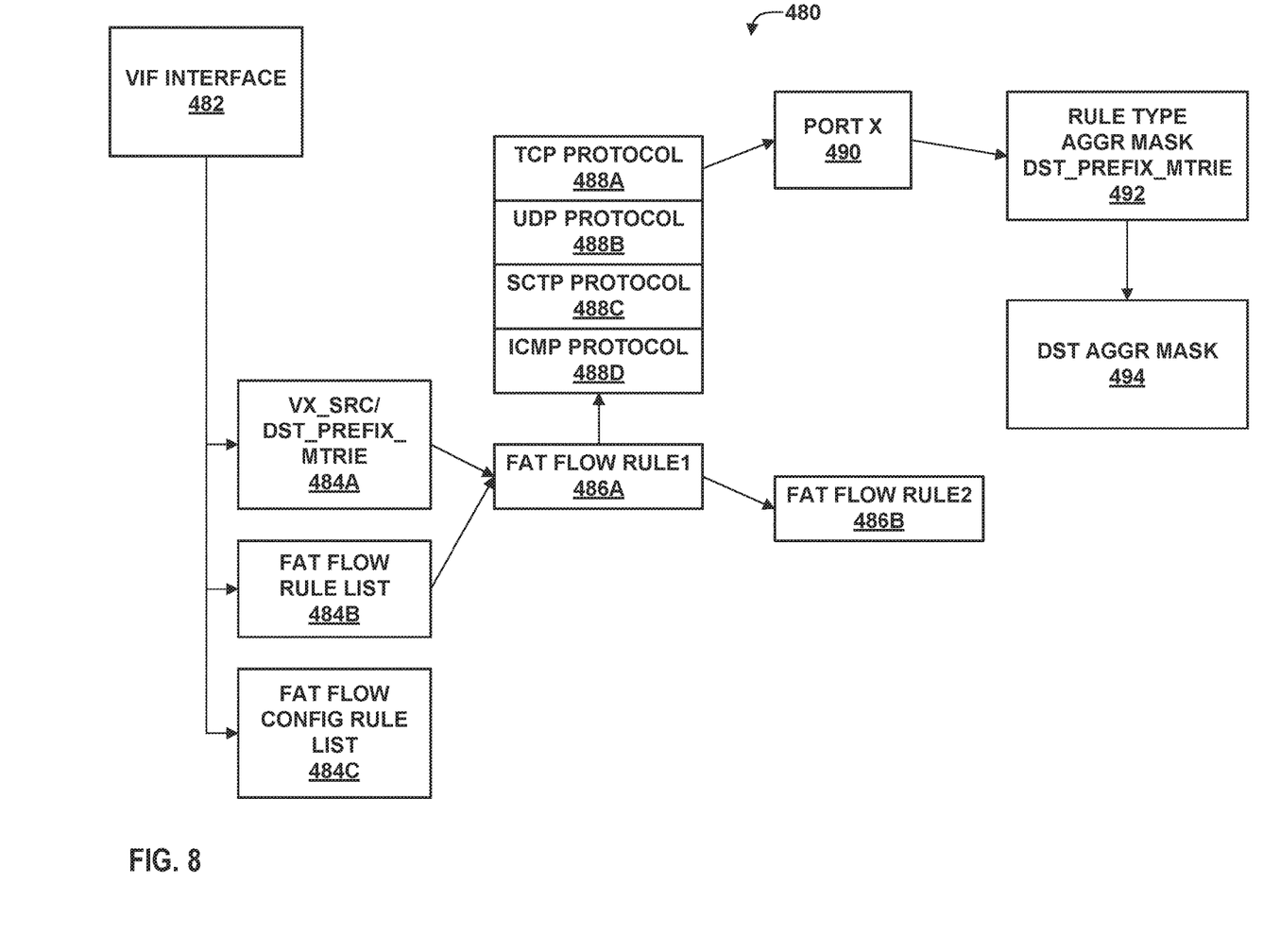
FIG. 8 is a block diagram illustrating an example data structure design for a virtual router according to the techniques of this disclosure.

FIG. 8 is a block diagram illustrating an example data structure design 480 for a virtual router according to the techniques of this disclosure. Data structure design 480 includes VIF interface 482, VX_src/dst_prefix_MTrie 484A, fat flow rule list 484B, fat flow config rule list 484C, fat flow rule1 486A, fat flow rule2 486B, protocols 488 including TCP protocol 488A, UDP protocol 488B, SCTP protocol 488C, and ICMP protocol 488D, port X 490, rule type aggr mask Dst_prefix_mtrie 492, and Dst Aggr mask 494. Virtual routers 30 may use data structure design 480 for fat flow rules based on source or destination prefix aggregation.

Virtual routers 30 may alternatively be configured to store fat flow rules in an array and use a binary search, in a hash table, or an I-Table first based on protocol and port number and then the prefix stored in an M-trie.

Figure 9:
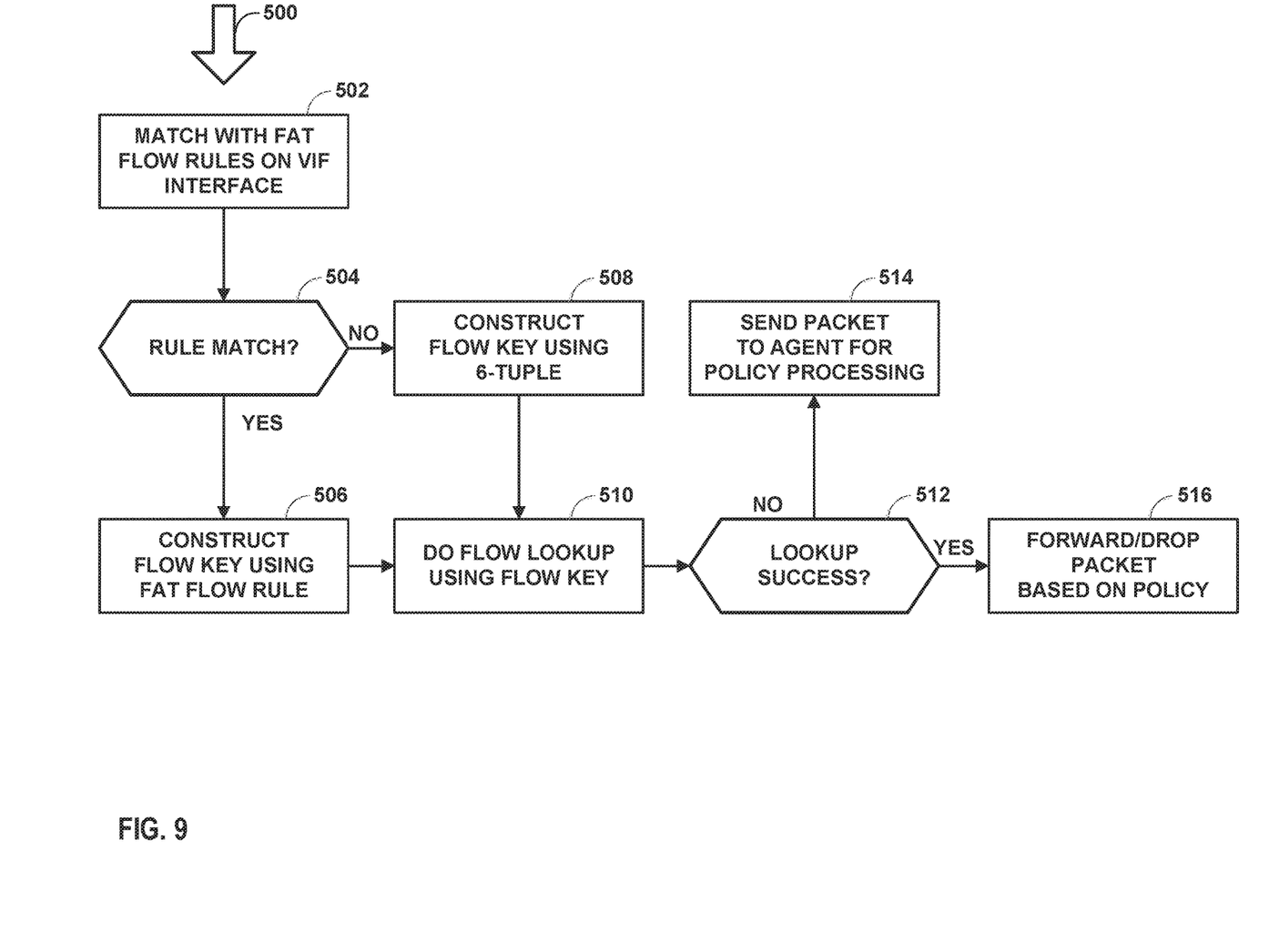
FIG. 9 is a flow diagram illustrating an example process for processing a received packet using prefix-based fat flows according to the techniques of this disclosure.

FIG. 9 is a flow diagram illustrating an example process for processing a received packet using prefix-based fat flows according to the techniques of this disclosure. Initially, one of virtual routers 30, e.g., virtual router 30A, receives a packet (500). Virtual router 30A then attempts to match the packet with a fat flow rule on a corresponding VIF interface (502). If there is a rule match ("YES" branch of 504), virtual router 30A constructs a flow key using the fat flow rule (506). If there is not a match ("NO" branch of 504), virtual router 30A constructs the flow key using the conventional 6-tuple (508).

In either case, virtual router 30 proceeds to perform a flow lookup using the flow key (510). Virtual router 30 then determines whether the lookup is successful (512). If the lookup is successful ("YES" branch of 512), virtual router 30 forwards or drops the packet according to a corresponding flow lookup corresponding to the flow key (516). If the lookup is not successful ("NO" branch of 512), virtual router 30 sends the packet to a corresponding one of VN agents 35 for policy processing (514).

Figure 10:
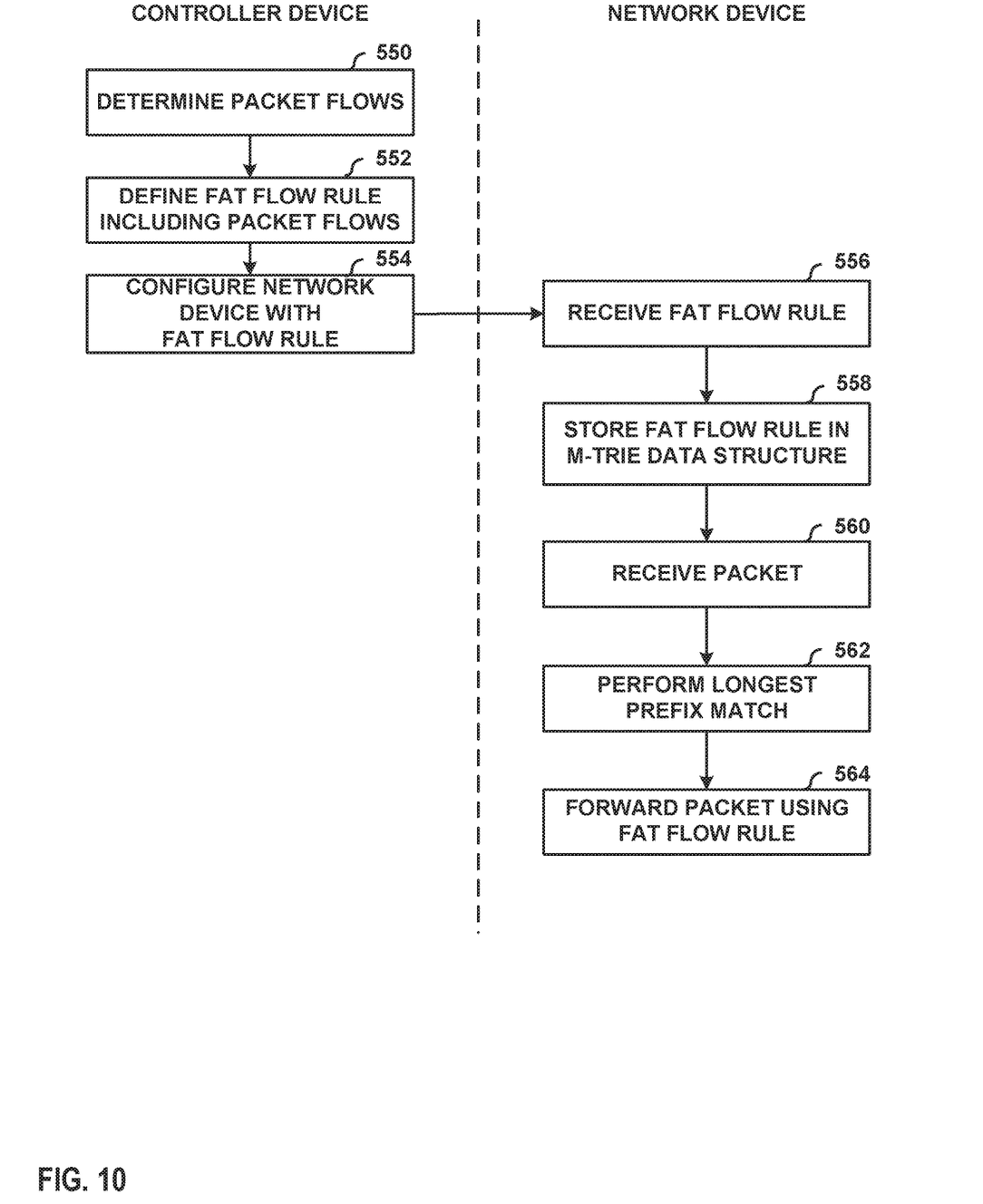
FIG. 10 is a flowchart illustrating an example method by which a controller device and a network device may perform techniques of this disclosure.

FIG. 10 is a flowchart illustrating an example method by which a controller device and a network device may perform techniques of this disclosure. Initially, VNC 22 (for example) may determine two or more flows to be aggregated into a fat flow (550). Each of the flows may have respective source IP addresses, destination IP addresses, source ports, destination ports, and protocols. VNC 22 may define a fat flow rule to form a fat flow including the flows (552). For example, VNC 22 may define the fat flow rule to specify a mask to be applied to source Internet protocol (IP) addresses and/or to destination IP addresses and/or that source ports or destination ports are to be ignored. VNC 22 may then configure a network device, such as virtual router 30, with the fat flow rule (554).

Virtual router 30 may receive the fat flow rule from VNC 22 (556) and store the fat flow rule in an M-trie data structure (558), e.g., as shown in FIG. 8. Virtual router 30 may then receive a packet (560). Virtual router 30 may perform a longest prefix match against data of a header of the packet and forwarding rules, including the fat flow rule (560). In response to determining that the longest prefix match indicates the fat flow rule, virtual router 30 may forward the packet using the fat flow rule (564). In particular, virtual router 30 may determine that packets of any of the various flows aggregated to form the flow match the fat flow rule using the longest prefix match, e.g., by applying the mask specified in the fat flow rule to IP addresses of the packets and/or by disregarding source or destination ports of the packets.

In this manner, the method of FIG. 10 represents an example of a method including determining, by a virtual network controller device comprising circuitry, a first flow defined by a first network tuple, the first network tuple comprising a first source Internet protocol (IP) address, a first destination IP address, a first source port, a first destination port, and a first protocol; determining, by the virtual network controller device, a second flow defined by a second network tuple, the second network tuple comprising a second source IP address, a second destination IP address, a second source port, a second destination port, and a second protocol; defining, by the virtual network controller device, a fat flow rule to form a fat flow comprising packets of the first flow and the second flow, wherein the fat flow rule specifies at least one of: a mask to be applied to the first source IP address and the second source IP address or to the first destination IP address and the second destination IP address; or that the first source port and the second source port or the first destination port and the second destination port are to be ignored; and configuring, by the virtual network controller device, a virtual router of a server device with the fat flow rule.

Likewise, the method of FIG. 10 represents an example of a method including receiving, by a network device, a first packet comprising a first source Internet protocol (IP) address, a first destination IP address, a first source port, a first destination port, and a first protocol; determining, by the network device, a fat flow for the first packet based on a fat flow rule; forwarding, by the network device, the first packet as part of the fat flow; receiving, by the network device, a second packet comprising a second source Internet protocol (IP) address, a second destination IP address, a second source port, a second destination port, and a second protocol; determining, by the network device, the fat flow for the second packet based on the fat flow rule; and forwarding, by the network device, the second packet as part of the fat flow, wherein the fat flow rule specifies at least one of: a mask to be applied to the first source IP address and the second source IP address and/or to the first destination IP address and the second destination IP address; or that the first source port and the second source port or the first destination port and the second destination port are to be ignored, and wherein at least one of the first source P address and the second source IP address are different or the first destination IP address and the second destination IP address are different, or at least one of the first source port and the second source port are different or the first destination port and the second destination port are different.

The techniques described herein, including in the preceding any of sections, may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   defining, by a virtual network controller device, a fat flow rule associated with a virtual interface of a virtual router of a server device to form a fat flow comprising packets of a first flow and a second flow transmitted via the virtual interface, the second flow being different than the first flow, the first flow having a first network destination different than the virtual network controller device, and the second flow having a second network destination different than the virtual network controller device, wherein the fat flow rule specifies at least one of:
   a mask to be applied to source Internet protocol (IP) addresses of packets of the first flow and the second flow or to destination IP addresses of the packets of the first flow and the second flow when forming the fat flow; or
   that source ports or destination ports of the packets of the first flow and the second flow are to be ignored when forming the fat flow; and
   configuring, by the virtual network controller device, the virtual router of the server device with the fat flow rule to cause the virtual router to form the fat flow including the packets of the first flow and the second flow and to forward the packets of the first flow and the second flow to a common next hop along a first route toward the first network destination and a second route toward the second network destination.

2. The method of claim 1, further comprising receiving, by the virtual network controller device, an input parameter specifying a length for the mask, wherein defining the fat flow rule comprises defining the fat flow rule to specify the length for the mask.

3. The method of claim 2, wherein the input parameter specifies the length as being one of 16 bits or 24 bits.

4. The method of claim 1, wherein configuring the virtual router comprises sending instructions to the virtual router to cause the virtual router to store the fat flow rule in an M-trie data structure in a database for a virtual interface of the virtual router.

5. The method of claim 4, wherein sending the instructions comprises sending instructions to the virtual router to cause the virtual router to:
   store a first node defining one or more protocols for the fat flow rule;
   store a second node defining a port for the fat flow rule; and
   store a third node defining one of a source aggregation mask for aggregating the first and second source IP addresses or a destination aggregation mask for aggregating the first and second destination IP addresses.

6. A method comprising:
   receiving, by a network device, a first packet comprising a first source Internet protocol (IP) address, a first destination IP address, a first source port, a first destination port, and a first protocol, the first destination IP address defining a first network destination different than a network controller device;
   determining, by the network device, a fat flow for the first packet based on a fat flow rule defined by the network controller device, the fat flow being associated with a virtual interface of the network device;
   forwarding, by the network device, the first packet as part of the fat flow to a next hop along a first route toward the first network destination;
   receiving, by the network device, a second packet comprising a second source Internet protocol (IP) address, a second destination IP address, a second source port, a second destination port, and a second protocol, the second destination IP address defining a second network destination different than the network controller device;
   determining, by the network device, the fat flow for the second packet based on the fat flow rule; and forwarding, by the network device, the second packet as part of the fat flow to the next hop, the next hop also being along a second route toward the second network destination, wherein the fat flow rule specifies at least one of:
a mask to be applied to the first source IP address and the second source IP address or to the first destination IP address and the second destination IP address; or that the first source port and the second source port or the first destination port and the second destination port are to be ignored, and wherein at least one of the first source IP address and the second source IP address are different or the first destination IP address and the second destination IP address are different, or at least one of the first source port and the second source port are different or the first destination port and the second destination port are different.

7. The method of claim 6, wherein the fat flow rule specifies a length for the mask.

8. The method of claim 7, wherein the length is one of 16 bits or 24 bits.

9. The method of claim 6, further comprising storing the fat flow rule in an M-trie data structure in a database for a virtual network interface of the network device.

10. The method of claim 9, wherein storing the fat flow rule comprises:
storing a first node defining one or more protocols for the fat flow rule;
storing a second node defining a port for the fat flow rule; and
storing a third node defining one of a source aggregation mask for aggregating first and second source IP addresses or a destination aggregation mask for aggregating first and second destination IP addresses.

11. The method of claim 6, further comprising receiving the fat flow rule from a virtual network controller device comprising the network controller device.

12. The method of claim 6, wherein determining the fat flow for the first packet and for the second packet comprises determining longest prefix matches for the first packet and the second packet using the fat flow rule.

13. A network device comprising:
one or more network interfaces configured to send and receive data via a network;
a memory configured to store data defining a fat flow rule associated with a virtual interface of the network device, wherein the fat flow rule specifies at least one of:
a mask to be applied to source Internet protocol (IP) addresses or to destination IP addresses; or
that source ports or destination ports are to be ignored; and
one or more processors implemented in circuitry and configured to:
receive a first packet comprising a first source Internet protocol (IP) address, a first destination IP address, a first source port, a first destination port, and a first protocol, the first destination IP address defining a first network destination different than a network controller device;
determine a fat flow for the first packet based on the fat flow rule defined by the network controller device;
forward, by the network device, the first packet as part of the fat flow to a next hop along a first route toward the first network destination;
receive a second packet comprising a second source Internet protocol (IP) address, a second destination IP address, a second source port, a second destination port, and a second protocol, the second destination IP address defining a second network destination different than the network controller device;
determine the fat flow for the second packet based on the fat flow rule; and
forward the second packet as part of the fat flow to the next hop, the next hop also being along a second route toward the second network destination,
wherein at least one of the first source IP address and the second source IP address are different or the first destination IP address and the second destination IP address are different, or at least one of the first source port and the second source port are different or the first destination port and the second destination port are different.

14. The network device of claim 13, wherein the fat flow rule specifies a length for the mask.

15. The network device of claim 14, wherein the length is one of 16 bits or 24 bits.

16. The network device of claim 13, wherein the one or more processors are further configured to store the fat flow rule in an M-trie data structure in a database for a virtual network interface of the network device, the database being stored in the memory.

17. The network device of claim 16, wherein to store the fat flow rule, the one or more processors are configured to:
store a first node defining one or more protocols for the fat flow rule;
store a second node defining a port for the fat flow rule; and
store a third node defining one of a source aggregation mask for aggregating the first and second source IP addresses or a destination aggregation mask for aggregating the first and second destination IP addresses.

18. The network device of claim 13, wherein the one or more processors are further configured to receive the fat flow rule from a virtual network controller device.

19. The network device of claim 13, wherein the one or more processors are configured to determine longest prefix matches for the first packet and the second packet using the fat flow rule to determine the fat flow.

20. The network device of claim 13, wherein the network device comprises at least one of a router, a firewall, or a load balancing device.

* * * * *